United States Patent
Lin (10) Patent No.: US 12,167,451 B2
(45) Date of Patent: Dec. 10, 2024

(54) METHODS FOR CHANNEL OCCUPANCY TIME SHARING, USER EQUIPMENT, BASE STATION AND COMPUTER READABLE MEDIUM

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 338 days.

(21) Appl. No.: 17/833,444

(22) Filed: Jun. 6, 2022

(65) Prior Publication Data

US 2022/0304053 A1    Sep. 22, 2022

Related U.S. Application Data (63) Continuation of application No. PCT/CN2020/134050, filed on Dec. 4, 2020.

(30) Foreign Application Priority Data

Dec. 6, 2019    (WO) .................. PCT/IB2019/001424

(51) Int. Cl.
*H04W 74/0808*    (2024.01)
*H04W 72/23*    (2023.01)

(52) U.S. Cl.
CPC ....... *H04W 74/0808* (2013.01); *H04W 72/23* (2023.01)

(58) Field of Classification Search
None
See application file for complete search history.

(56) References Cited

U.S. PATENT DOCUMENTS

| 7,158,058 B1 | 1/2007 | Yu |
| 2007/0153876 A1 | 7/2007 | Pi et al. |
| 2019/0297577 A1 | 9/2019 | Lin et al. |

(Continued)

FOREIGN PATENT DOCUMENTS

| CN | 103647745 A | 3/2014 |
| CN | 101919176 B | 4/2014 |

(Continued)

OTHER PUBLICATIONS

3GPP TSG RAN WG1 #99 R1-1912015, Reno, USA, Nov. 18-22, 2019, Source: vivo, Title: Discussion on the enhancements to configured grants, Agenda Item: 7.2.2.2.4, Document for: Discussion and Decision.

(Continued)

*Primary Examiner* — Anh Vu H Ly
(74) *Attorney, Agent, or Firm* — PERKINS COIE LLP (57) ABSTRACT

Methods for channel occupancy time sharing, user equipment, base station and computer readable medium are provided. The method includes: indicating Channel Occupancy Time (COT) sharing information for sharing a COT initiated by the UE in a Configured Grant Uplink Control Indicator (CG-UCI); including the CG-UCI in a Configured Grant Physical Uplink Shared CHannel (CG-PUSCH); and transmitting the CG-PUSCH to a Base Station (BS).

18 Claims, 9 Drawing Sheets

```
Indicating COT sharing information for sharing a COT     S100
initiated by the UE in a Configured Grant Uplink Control
                  Indicator (CG-UCI)

Including the CG-UCI in a Configured Grant Physical      S120
     Uplink Shared CHannel (CG-PUSCH);

Transmitting the CG-PUSCH to a Base Station (BS)         S140
```

(56) References Cited

U.S. PATENT DOCUMENTS

| | | | |
|---|---|---|---|
| 2020/0275372 | A1 | 8/2020 | Lin et al. |
| 2021/0105812 | A1* | 4/2021 | Rastegardoost .......... H04L 1/08 |
| 2021/0105815 | A1* | 4/2021 | Salem .................... H04W 16/14 |
| 2022/0095301 | A1* | 3/2022 | Oviedo ............. H04W 74/0808 |
| 2022/0150917 | A1* | 5/2022 | Wang .................... H04W 16/14 |
| 2022/0167407 | A1* | 5/2022 | Oviedo ............. H04W 74/0808 |
| 2022/0167413 | A1* | 5/2022 | Myung ............... H04W 74/004 |
| 2022/0210831 | A1* | 6/2022 | Lin ........................ H04W 72/23 |
| 2022/0217544 | A1* | 7/2022 | Lin ................... H04W 72/0446 |

FOREIGN PATENT DOCUMENTS

| | | |
|---|---|---|
| CN | 105530647 A | 4/2016 |
| CN | 107889114 A | 4/2018 |
| CN | 108370582 A | 8/2018 |
| EP | 3396868 B1 | 8/2020 |
| JP | 2007158714 A | 6/2007 |
| JP | 2007300384 A | 11/2007 |
| KR | 20050114999 A | 12/2005 |
| WO | 2006107047 A1 | 10/2006 |
| WO | 2007023524 A1 | 3/2007 |
| WO | 2007052649 A1 | 5/2007 |
| WO | 2007080854 A1 | 7/2007 |
| WO | 2007083569 A1 | 7/2007 |
| WO | 2007108602 A1 | 9/2007 |
| WO | 2008000069 A1 | 1/2008 |
| WO | 2018106911 A2 | 6/2018 |
| WO | 2021063385 A1 | 4/2021 |
| WO | 2021073495 A1 | 4/2021 |
| WO | 2021092256 A1 | 5/2021 |

OTHER PUBLICATIONS

3GPP TSG RAN WG1 #96bis R1-1904250, Xi'an, China, Apr. 8-12, 2019, Agenda Item: 7.2.2.2.1, Source: Sony, Title: Channel access for NR unlicensed operations, Document for: Discussion/Decision.

3GPP TSG RAN WG1#99 R1-1912012, Reno, USA, Nov. 18-22, 2019, Source: vivo, Title: Discussion on the channel access procedures, Agenda Item: 7.2.2.2.1, Document for: Discussion and Decision.

International Search Report in the international application No. PCT/CN2020/134050, mailed on Mar. 10, 2021.

Written Opinion of the International Search Authority in the international application No. PCT/CN2020/134050, mailed on Mar. 10, 2021.

3GPP TSG RAN WG1#99 R1-1912016, Reno, USA, Nov. 18-22, 2019, Agenda Item: 7.2.2.2.4, Source: vivo, Title: Feature lead summary on Configured grant enhancement, Document for: Discussion and decision.

3GPP TSG RAN WG1#99 R1-1913419, Reno, USA, Nov. 18-22, 2019, Agenda Item: 7.2.2.2.4, Source: vivo, Title: Summary of offline discussion on NRU CG, Document for: Discussion and decision.

3GPP TSG RAN WG1 Meeting #99 R1-1912941, Reno, USA, Nov. 18-Nov. 22, 2019, Agenda item: 7.2.2.2.4, Source: Qualcomm Incorporated, Title: Enhancement to configured grants in NR unlicensed, Document for: Discussion and Decision.

3GPP TSG RAN WG1 #99 R1-1912877, Reno, USA, Nov. 18-22, 2019, Source: NTT Docomo, Inc., Title: Configured grant enhancement for NR-U, Agenda Item: 7.2.2.2.4, Document for: Discussion and Decision.

3GPP TSG-RAN WG1 Meeting #99 R1-1912712, Reno, USA, Nov. 18-22, 2019, Agenda Item: 7.2.2.2.4, Source: Ericsson, Title: Configured grant enhancement, Document for: Discussion, Decision.

3GPP TSG RAN WG1 meeting #99 R1-1912342, Reno, US, Nov. 18-22, 2019, Agenda Item: 7.2.2.2.4, Source: Sony, Title: Enhancements to Configured Grants in NR-U, Document for: Decision.

3GPP TSG RAN WG1 #99 R1-1912329, Reno, USA, Nov. 18-22, 2019, Agenda Item: 7.2.2.2.4, Source: Lenovo, Motorola Mobility, Title: Configured grant enhancement for NR-U, Document for: Discussion & Decision.

3GPP TSG RAN WG1 Meeting #99 R1-1912260, Reno, US, Nov. 18-22, 2019, Agenda item: 7.2.2.2.4, Source: Nokia, Nokia Shanghai Bell, Title: On support of UL transmission with configured grants in NR-U, Document for: Discussion and Decision.

3GPP TSG RAN WG1 Meeting #99 R1-1912200, Reno, USA, Nov. 18-22, 2019, Agenda Item: 7.2.2.2.4, Source: Intel Corporation, Title: Enhancements to configured grants for NR-unlicensed, Document for: Discussion/Decision.

3GPP TSG RAN WG1 Meeting #99 R1-1911869, Reno, USA, Nov. 18-22, 2019, Agenda Item: 7.2.2.2.4, Source: Huawei, HiSilicon, Title: Transmission with configured grant in NR unlicensed band, Document for: Discussion and Decision.

3GPP TS 37.213 V15.2.0 (Mar. 2019), 3rd Generation Partnership Project; Technical Specification Group Radio Access Network; Physical layer procedures for shared spectrum channel access (Release 15).

3GPP TSG RAN WG1 Meeting #98bis R1-1910045, Chongqing, China, Oct. 14-20, 2019, Agenda Item: 7.2.2.2.1, Source: Huawei, HiSilicon, Title: Coexistence and channel access for NR unlicensed band operations, Document for: Discussion and Decision.

Ad-hoc Chair (Ericsson), "Chairman's notes of AI 7.2.2 NR-Based Access to Unlicensed Spectrum", 3GPP TSG-RAN WG1 Meeting #99 Tdoc R1-1913383, Reno, Nevada, USA, Nov. 18-22, 2019. 21 pages.

Supplementary European Search Report in the European application No. 20897079.8, mailed on Nov. 15, 2022. 9 pages.

First Office Action of the Chinese application No. 202211104217.8, issued on Jul. 20, 2024, 18 pages with English translation.

* cited by examiner

METHODS FOR CHANNEL OCCUPANCY TIME SHARING, USER EQUIPMENT, BASE STATION AND COMPUTER READABLE MEDIUM

CROSS-REFERENCE TO RELATED APPLICATION

The application is a continuation application of International Patent Application No. PCT/CN2020/134050, which is filed on Dec. 4, 2020 and claims the priority to PCT application PCT/IB2019/001424, which is filed on Dec. 6, 2019; the entire content from both applications are incorporated herein by reference.

BACKGROUND

The statements in this section merely provide information related to the present disclosure and may not constitute prior art. Further, the content in this section may be used to define a concept related to the invention.

For example, in a 5G (fifth generation) network using the 5G NR (New Radio) as radio access technology (RAT) defined by 3GPP, unlicensed spectrum (5G NR-U) may be used.

The unlicensed spectrum is a shared spectrum. user equipment (UE) in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, a communication device shall follow the principle of "Listen Before Talk (LBT)", that is, the device needs to perform channel sensing before transmitting a signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed a Maximum Channel Occupancy Time (MCOT).

SUMMARY

The present disclosure relates to communication technology, in particular to Channel Occupancy Time (COT) sharing. Methods for channel occupancy time sharing, user equipment, base station and computer readable medium are provided.

BRIEF DESCRIPTION OF THE DRAWINGS

The drawings are used merely for illustration purposes but not for limiting the invention.

DETAILED DESCRIPTION

On an unlicensed carrier as an example, for a channel occupation time (COT) obtained by a base station (BS), e.g., a gNB or an eNB, for downlink transmission, the base station may share the COT to the UE for transmitting an uplink signal or an uplink channel. In other words, when the base station shares its own COT with the UE, the UE can use the LBT mode with a higher priority than that used by the UE itself to obtain the channel, thereby obtaining the channel with a greater probability.

On the other hand, when a BS, e.g., a gNB or an eNB, configures one or multiple PUSCH resources for one or multiple UE uplink transmissions, the UE may initiate a COT for the uplink transmission and the UE initiated COT can be shared with the BS.

Example 1

In this example, in a configured grant transmission, the UE may be configured with one or multiple Configured Grant Physical Uplink Sharing Channel (CG-PUSCH) resources, e.g., by a BS through Radio Resource Control (RRC). The UE can select the CG-PUSCH resources to transmit data. For each CG-PUSCH transmission, the UE may include a CG Uplink Control Indicator (CG-UCI). This CG-UCI may include COT sharing information for sharing this COT initiated by the UE, e.g., information about whether or not this COT initiated by the UE can be shared with the BS. There may be two cases for the UE-COT sharing for sharing this COT initiated by the UE. In the first case, if an Energy Detection (ED) threshold for the UE-COT sharing is configured by the BS to the UE, the UE may include an indication of a slot offset and an allowable transmission duration in the CG-UCI. The ED threshold may be an RRC parameter configured to the UE by the BS in relation to COT sharing. Once the BS receives the COT sharing information, the BS may know from which slot the BS can share the COT and it can share for how long duration. That is, the BS can determine a start of COT sharing, from which the BS can start to share the COT, and a duration that the BS is allowed to share the COT. In the second case, when the ED threshold is not configured, the UE may include 1-bit sharing on/off information in the CG-UCI and if it indicates that the COT sharing is allowed, the BS can start to share the COT from the first symbol of the next slot+i symbols, where i can be semi-statically configured or dynamically indicated, e.g., by a higher layer such as through an RRC parameter.

Figure 1:
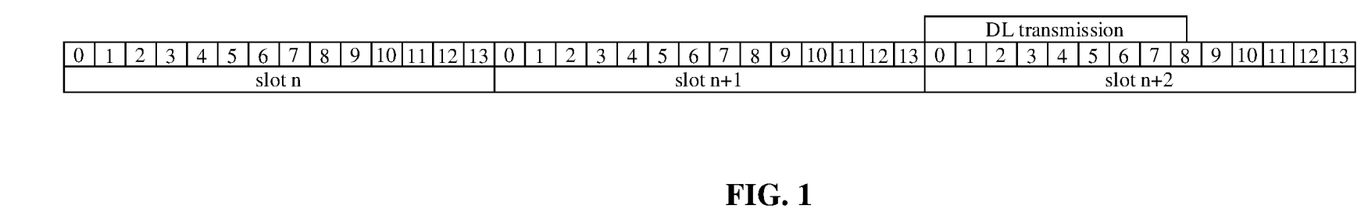
FIG. 1 shows an example of COT sharing.

For example, in FIG. 1, if CG-PUSCH and CG-UCI are transmitted in slot n, and the UE indicates a slot offset O, where O is a positive integer, it is from slot n+O that the BS can start to share the COT. The BS can start to share the COT from the first symbol of slot n+O. In the example of FIG. 1, O equals to 2. The duration that the BS is allowed to share the COT may be a number of symbols or a number of slots.

Figure 2:
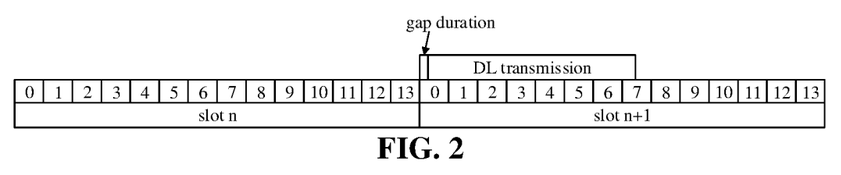
FIG. 2 shows a further example of COT sharing.

For example, in FIG. 2, if CG-PUSCH and CG-UCI are transmitted in slot n, and the UE indicates that the next slot can be shared with the BS. The BS can start to share the COT from the first symbol of slot n+1. The BS can also start to share the COT from the first symbol of the next slot+i symbols. The duration that the BS is allowed to share the COT may be a number of symbols or a number of slots.

Example 2

Figure 3:
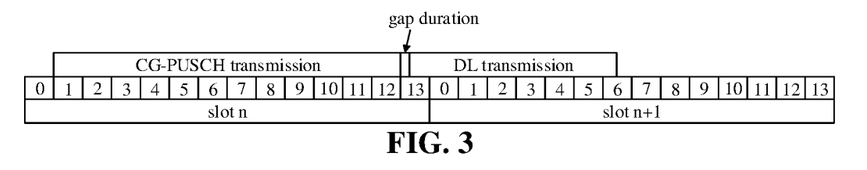
FIG. 3 shows a further example of COT sharing.

For configured grant PUSCH transmissions, if a UE is configured by one or more CG configurations and the corresponding CG PUSCH resources in a slot, e.g. slot n, do not occupy the last X OFDM symbols, such as in the example shown in FIG. 3. This X OFDM symbol nonoccupation may be due to two reasons: 1) these X OFDM symbols do not belong to CG-PUSCH resources. 2) these X OFDM symbols are configured for CG-PUSCH but the UE does not have any actual transmission in these resources.

For example, in FIG. 3, CG-PUSCH does not fill up the last symbol of slot n, to guarantee a gap duration, the BS may start DL transmission from slot n on symbol 13.

In this case, the UE cannot indicate that the BS can share the UE-COT from any symbol of the next slot, i.e. slot n+1. The reason of this UE behavior is that the condition under which the BS can share the UE-COT is that a gap duration shall be guaranteed between the end of the UE transmission and the start of the BS transmission. This gap duration can be from 0 up to 16 µs if the BS uses LBT Cat1 or Cat2, or 25 µs if the BS uses LBT Cat2. In this case, if the UE transmission ends too early in slot n, to guarantee the gap duration the BS has to start transmission in slot n as shown in FIG. 3, which may be not allowed because the UE only indicates that the BS can share the COT from the starting symbol. The starting symbol is i-th symbol after the end of slot n. The minimum value of i is 0. This means that the BS can start sharing the COT earliest from symbol 0 of slot n+1. In FIG. 3, it can be seen that to guarantee gap duration, if the last X symbols prior to the starting symbol (assuming i=0 in FIG. 3), are empty, the BS might need to start sharing already in slot n. Therefore, X non-occupied OFDM symbols should be the threshold value, i.e. beyond X, the UE-COT cannot be shared. The X value can be related to the subcarrier spacing (SCS), i.e. 15 khz, 30 khz or 60 khz.

One possibility is that X may be a smallest positive integer value that makes $X*Ls<25$ µs, where Ls is the OFDM symbol length. With this criterion, for SCS=15 khz or 30 khz, X=0, and for SCS=60 khz, X=1 (as shown in FIG. 4).

Figure 4:
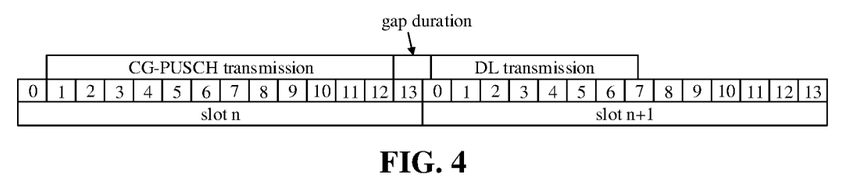
FIG. 4 shows a further example of COT sharing.

For example, in FIG. 4, CG-PUSCH does not fill up the last symbol of slot n, to guarantee a gap duration, the BS has to start DL transmission from slot n on symbol 13, but for SCS=60 khz, the OFDM symbol length is shorter than 25 µs, thus for gap duration 25 µs, the last OFDM symbol is allowed to be left empty.

Moreover, the UE has to make sure that between the end of the CG-PUSCH, where the UE includes the CG-UCI indicating sharing is allowed, and the X symbols prior to the starting symbol, there is no empty OFDM symbols. Otherwise, the UE should not indicate that the sharing is allowed.

Alternatively, when the BS receives an indication for UE-COT sharing, and even if the sharing is allowed, the BS may need to ensure that there is no empty OFDM symbols between the end of the CG-PUSCH, where the UE includes that the CG-UCI indicating sharing is allowed, and the X symbols prior to the starting symbol. If this is not the case, the BS may ignore the COT indication and consider the COT is not for sharing.

Example 3

When the ED threshold is not configured, the UE transmits a CG-PUSCH including a CG-UCI in slot n, where the COT sharing information indicated in the CG-UCI may be a 1-bit sharing indication indicating whether COT sharing is allowed by the BS, to inform the BS whether from the i-th symbol after the end of slot n can be shared by the BS. If there are multiple CG-PUSCHs in the same slot n, each CG-PUSCH may include a CG-UCI and this 1-bit sharing indication is supposed to be the same value among different CG-UCIs from different CG-PUSCHs in the same slot.

Figure 5:
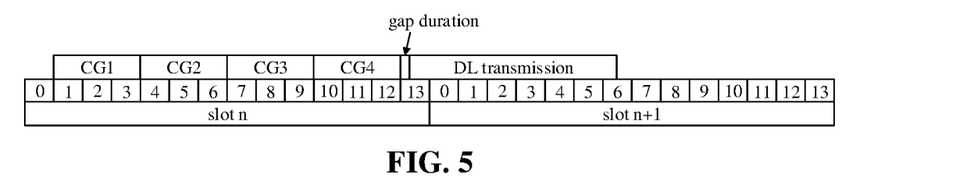
FIG. 5 shows a further example of COT sharing.

For example, in FIG. 5, there are multiple CG-PUSCHs in the same slot. Each CG-PUSCH may contain a CG-UCI and the 1-bit sharing indication should be aligned among these CG-UCIs in the same slot. The term "aligned" here means that the 1-bit sharing indication in each of the CG-PUSCHs in the same slot should be the same value, in particular when the 1-bit sharing indication indicates that COT sharing is allowed by the BS.

Example 4

When the ED threshold is configured, the UE transmits a CG-PUSCH including a CG-UCI in slot n. In the CG-UCI, the UE may indicate a slot offset, e.g. m, with respect to the current slot n. That is, from slot n+m, the BS can start to share the UE-COT.

Figure 6:
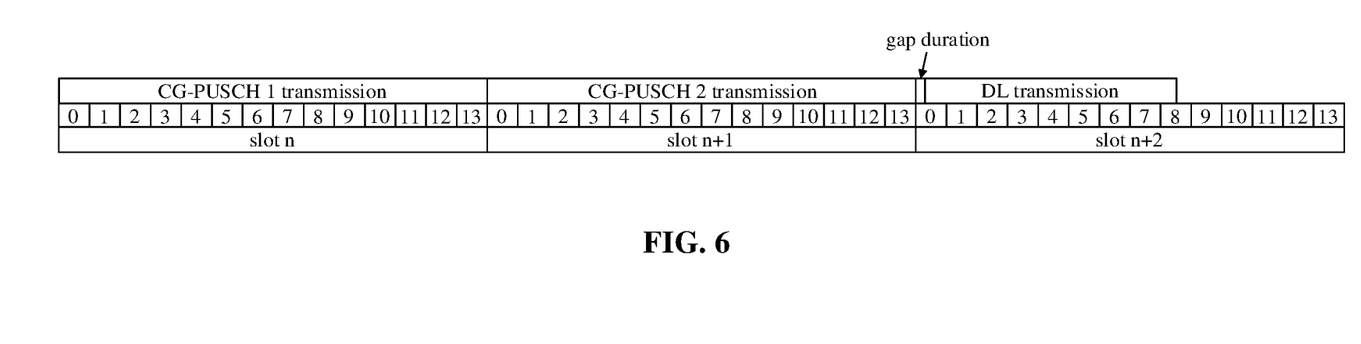
FIG. 6 shows a further example of COT sharing.

For Example, in FIG. 6, if the CG-UCI in CG-PUSCH 1 transmitted in slot n indicates that UE-COT is allowed for sharing, this CG-UCI may indicate a slot offset 2 indicating that the BS can start to share the COT from slot n+2. In this case, the CG-UCI in CG-PUSCH 2 transmitted in slot n+1 should be aligned and the offset value therein should be set accordingly with respect to the offset value given in CG-UCI of CG-PUSCH1, i.e., the slot offset value in the CG-UCI of the CG-PUSCH2 shall be 1, so that it indicates that the BS can start to share the COT from slot n+1+1, i.e., slot n+2.

If there are multiple CG-PUSCHs between slot n and slot n+m, the slot offset indicated in each CG-UCI carried in each CG-PUSCH should be aligned, i.e. pointing to the same slot n+m.

Example 5

In some cases, a UE can change the previous decision about the enabling the COT sharing with a BS. One example is that when a UE has very few data to transmit and the UE cannot ensure all the CG-PUSCHs can be used. In this case, the UE may decide not to share the COT with the BS, i.e. in CG-UCI UE indicates the COT is not shared. But later on, the UE has more data to be transmitted in the upcoming CG-PUSCH and it can ensure a continuous CG-PUSCH transmission without any gap. Then, the UE can indicate in a later CG-UCI that the COT can be shared. In this case, the later CG-UCI may override the previous COT sharing decision of the previous CG-UCI.

In view of the above, it may be provided with a method, performed by UE, for indicating UE-channel occupancy time (UE-COT) sharing with a BS in a UE initiated COT for configured grant transmission, the method may comprise one or more steps of:

including in a CG-UCI a UE-COT sharing indication;
    including in the CG-UCI, an indication about a starting symbol from which the BS can share the COT, if UE-COT sharing is allowed by the UE;
    indicating in the CG-UCI a BS sharing duration;
    transmitting the CG-UCI in a CG-PUSCH in a first slot (slot n).

Advantageously, the starting symbol may be any of the followings:

the starting symbol may be the i-th symbol after the end of the first slot (slot n), where i is an integer, if the UE-COT indication in the corresponding CG-UCI indicates that sharing is allowed, and if an energy detection (ED) threshold for UE-COT sharing is not configured; or the starting symbol may be the j-th symbol in the slot n+m, where j is an integer, if the UE-COT indication in the corresponding CG-UCI indicates that sharing is allowed, together with an indication of slot offset m, and if the ED threshold for UE-COT sharing is configured;

i and j may be configured or predefined.

Advantageously, if a first condition is not satisfied, not indicating that the UE-COT sharing is allowed.

Advantageously, the first condition is between the end of the CG-PUSCH, where CG-UCI indicates that sharing is allowed, and X OFDM symbols prior to the starting symbol, there is no empty OFDM symbol, where X is an integer.

Advantageously, X depends on subcarrier spacing (SCS).

Advantageously, the empty OFDM symbols means the UE does not conduct any actual transmission on these OFDM symbols. This is due to that the OFDM symbols are not belong to configured grant PUSCH resources; or the UE does not have any data to be transmitted on these OFDM symbols.

Advantageously, the UE-COT sharing indication may be a 1-bit explicit indication, where '1' means allowed and '0' means not allowed; or may implicitly indicate whether UE-COT sharing is allowed by the BS.

Advantageously, if multiple CG-UCIs are transmitted in the same slot, the UE-COT sharing indication should be aligned.

It may be further provided a method, performed by a BS, for determining the UE-COT sharing in UE configured grant transmission, the method may comprise one or more steps of:

receiving a CG-UCI from a configured UE CG-PUSCH resource in slot n;

determining UE-COT sharing information based on the UE-COT sharing indication, a starting slot and a sharing duration.

Advantageously, the starting slot may be any of the followings:

the starting symbol may be the i-th symbol after the end of the first slot (slot n), where i is an integer, if the UE-COT indication in the corresponding CG-UCI indicates that sharing is allowed, and if the ED threshold for UE-COT sharing is not configured; or the starting symbol may be the j-th symbol in the slot n+m, where j is an integer, if the UE-COT indication in the corresponding CG-UCI indicates that sharing is allowed, together with an indication of slot offset m, and if the ED threshold for UE-COT sharing is configured;

i and j may be configured or predefined.

Advantageously, the method may comprise steps of ignoring the UE-COT sharing information and considering the UE-COT not to be shared, if a first condition is not satisfied.

Advantageously, the first condition is between the end of the CG-PUSCH, where CG-UCI indicates that sharing is allowed, and X OFDM symbols prior to the starting symbol, there is no empty OFDM symbol, where X is an integer.

Advantageously, X depends on subcarrier spacing (SCS).

Advantageously, the empty OFDM symbols means the UE does not conduct any actual transmission on these OFDM symbols. This is due to that the OFDM symbols are not belong to configured grant PUSCH resources; or the UE does not have any data to be transmitted on these OFDM symbols.

Clauses

Figure 7:
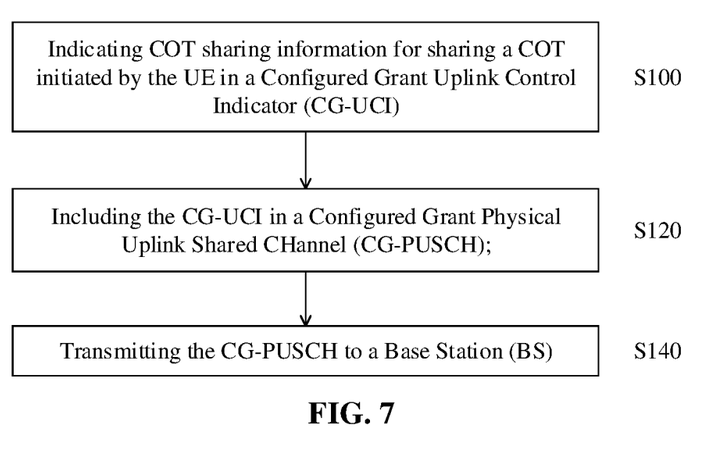
FIG. 7 shows an example of a method.

1. A method for Channel Occupancy Time (COT) sharing, performed by User Equipment (UE), comprising:
    Indicating (S100) COT sharing information for sharing a COT initiated by the UE in a Configured Grant Uplink Control Indicator (CG-UCI);
    Including (S120) the CG-UCI in a Configured Grant Physical Uplink Shared CHannel (CG-PUSCH);
    Transmitting (S140) the CG-PUSCH to a Base Station (BS).
    An example of the method is shown in FIG. 7.
2. The method of clause 1, wherein
    if an Energy Detection (ED) threshold for COT sharing is configured by the BS to the UE, the COT sharing information includes an indication of a slot offset O and an allowable transmission duration, wherein 0 is a positive integer.
3. The method of clause 2, wherein
    if the CG-PUSCH is transmitted in a slot numbered with n, the slot offset O indicates that a start of COT sharing, from which the BS can start to share the COT, is a first symbol of a slot numbered with n+O, wherein n is an integer.
4. The method of clause 2 or 3, wherein
    the allowable transmission duration indicates a duration that the BS is allowed to share the COT.
5. The method of any of the preceding clauses, wherein
    if an ED threshold is not configured by the BS to the UE, the COT sharing information includes sharing on/off information.
6. The method of clause 5, wherein
    the sharing on/off information is 1-bit information indicating whether COT sharing is allowed.
7. The method of any one of the preceding clauses, wherein
    the UE transmits to the BS a first CG-PUSCH and a second CG-PUSCH after the first CG-PUSCH, wherein the first CG-PUSCH includes a first CG-UCI and the second CG-PUSCH includes a second CG-UCI, wherein the first CG-UCI indicates first COT sharing information and the second CG-UCI indicates second COT sharing information.
8. The method of clause 7, wherein
    if the first COT sharing information indicates that the UE allows COT sharing by the BS, the first COT sharing information and the second COT sharing information are aligned.
9. The method of clause 8, wherein
    if an ED threshold is not configured by the BS to the UE, the first COT sharing information and the second COT sharing information being aligned means:
    each of the first COT sharing information and the second COT sharing information includes sharing on/off information, and the sharing on/off information in each of the first COT sharing information and the second COT sharing information indicates that the UE allows COT sharing by the BS.
10. The method of clause 8 or 9, wherein
    if an ED threshold is configured by the BS to the UE, the first COT sharing information and the second COT sharing information being aligned means:

the first COT sharing information and the second COT sharing information indicate a same start of COT sharing from which the BS can start to share the COT.

11. The method of clause 10, wherein
when the first and second CG-PUSCHs are transmitted in different slots, the first COT sharing information and the second COT sharing information indicate slot offsets pointing to a same slot, of which the first symbol is the start of the COT sharing from which the BS can start to share the COT.

12. The method of any one of clauses 8 to 11, wherein
if the UE transmits one or more further CG-PUSCHs to the BS after the second CG-PUSCH, each of the one or more further CG-PUSCHs includes a CG-UCI indicating COT sharing information that is aligned with the first and second sharing information.

13. The method of clause 7, wherein
if the first COT sharing information indicates that the UE does not allow COT sharing by the BS, the second COT sharing information overrides the first COT sharing information if the second COT sharing information indicates that the UE allows COT sharing by the BS.

14. A method for Channel Occupancy Time (COT) sharing, performed by a Base Station (BS), comprising:
receiving, from User Equipment (UE), COT sharing information indicated in a Configured Grant Uplink Control Indicator (CG-UCI) that is included in a Configured Grant Physical Uplink Shared CHannel (CG-PUSCH).

15. The method of clause 14, wherein
if an Energy Detection (ED) threshold for COT sharing is configured by the BS to the UE, the COT sharing information includes an indication of a slot offset O and an allowable transmission duration, wherein O is a positive integer.

16. The method of clause 15, comprising
determining a start of COT sharing, from which the BS can start to share the COT, as a first symbol of a slot numbered with n+O, if the CG-PUSCH is received in a slot numbered with n, wherein n is an integer.

17. The method of clause 15 or 16, comprising
determining a duration that the BS is allowed to share the COT based on the allowable transmission duration.

18. The method of any one of clauses 14 to 17, wherein
if an ED threshold is not configured by the BS to the UE, the COT sharing information includes sharing on/off information.

19. The method of clause 18, comprising
determining whether COT sharing is allowed based on the sharing on/off information.

20. The method of clause 19, comprising
if it is determined that COT sharing is allowed, determining a start of COT sharing, from which the BS can start to share the COT, as the first symbol of a slot numbered with n+1 plus i symbols, if the CG-PUSCH is received in a slot numbered with n, wherein n is an integer, and wherein i is an integer being equal to or greater than zero and is semi-statically configured.

21. The method of any one of preceding clauses, wherein the base station is an eNB for a Long Term Evolution (LTE) system or a gNB for $5^{th}$ Generation (5G) system.

22. User equipment (UE), configured to perform the method of any one of clauses 1 to 13 and 21.

Figure 8:
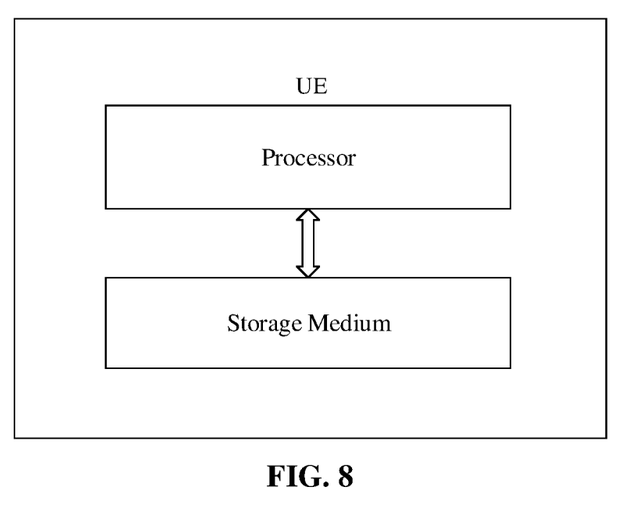
FIG. 8 shows an example of UE.

23. The UE of clause 22, comprising one or more storage medium storing computer readable instructions, and one or more computing processors configured to execute the computer readable instructions for performing the method of any one of clauses 1 to 13 and 21. An example is shown in FIG. 8.

24. A computer program, comprising instructions, when executed by User Equipment UE), for causing the UE to perform the method according to any one of clauses 1 to 13 and 21.

25. A computer readable medium, comprising instructions, when executed by User Equipment (UE), causing the UE to perform the method of any one of clauses 1 to 13 and 21.

26. A base station (BS), configured to perform the method of any one of clauses 14 to 21.

Figure 9:
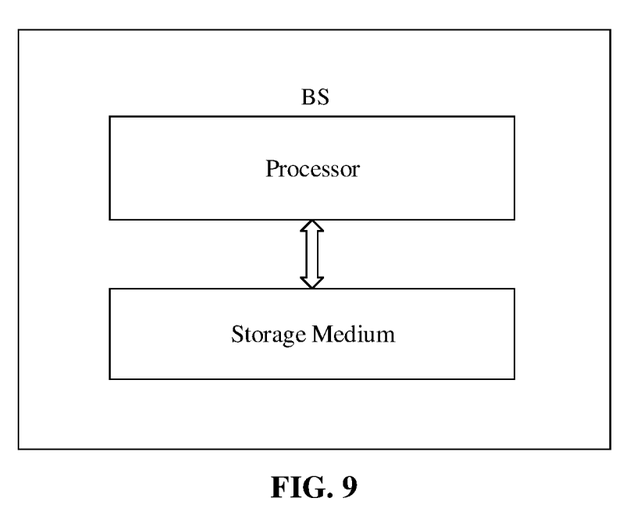
FIG. 9 shows an example of a base station.

27. The BS of clause 26, comprising one or more storage medium storing computer readable instructions, and one or more computing processors configured to execute the computer readable instructions for performing the method of any one of clauses 14 to 21. An example is shown in FIG. 9.

28. A computer program, comprising instructions, when executed by a Base Station (BS), for causing the BS to perform the method according to any one of clauses 14 to 21.

29. A computer readable medium, comprising instructions, when executed by a Base Station (BS), causing the BS to perform the method of any one of clauses 14 to 21.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

What is claimed is:

1. A method for Channel Occupancy Time (COT) sharing, performed by User Equipment (UE), comprising:
indicating COT sharing information for sharing a COT initiated by the UE in a Configured Grant Uplink Control Indicator (CG-UCI);
including the CG-UCI in a Configured Grant Physical Uplink Shared CHannel (CG-PUSCH); and
transmitting the CG-PUSCH to a Base Station (BS),
wherein if an Energy Detection (ED) threshold for COT sharing is not configured by the BS to the UE, the COT sharing information includes sharing on/off information.

2. The method of claim 1, wherein
if the ED threshold for COT sharing is configured by the BS to the UE, the COT sharing information includes an indication of a slot offset O and an allowable transmission duration, wherein O is a positive integer.

3. The method of claim 2, wherein
if the CG-PUSCH is transmitted in a slot numbered with n, the slot offset O indicates that a start of COT sharing, from which the BS can start to share the COT, is a first symbol of a slot numbered with n+O, wherein n is an integer.

4. The method of claim 2, wherein
the allowable transmission duration indicates a duration that the BS is allowed to share the COT.

5. The method of claim 1, wherein
the sharing on/off information is 1-bit information indicating whether COT sharing is allowed.

6. The method of claim 1, wherein
the UE transmits to the BS a first CG-PUSCH and a second CG-PUSCH after the first CG-PUSCH, wherein the first CG-PUSCH includes a first CG-UCI and the second CG-PUSCH includes a second CG-UCI, wherein the first CG-UCI indicates first COT sharing information and the second CG-UCI indicates second COT sharing information.

7. The method of claim 6, wherein
if the first COT sharing information indicates that the UE allows COT sharing by the BS, the first COT sharing information and the second COT sharing information are aligned.

8. The method of claim 7, wherein
if an ED threshold is not configured by the BS to the UE, the first COT sharing information and the second COT sharing information being aligned means:
each of the first COT sharing information and the second COT sharing information includes sharing on/off information, and the sharing on/off information in each of the first COT sharing information and the second COT sharing information indicates that the UE allows COT sharing by the BS.

9. The method of claim 7, wherein
if an ED threshold is configured by the BS to the UE, the first COT sharing information and the second COT sharing information being aligned means:
the first COT sharing information and the second COT sharing information indicate a same start of COT sharing from which the BS can start to share the COT.

10. The method of claim 9, wherein
when the first and second CG-PUSCHs are transmitted in different slots, the first COT sharing information and the second COT sharing information indicate slot offsets pointing to a same slot, of which the first symbol is the start of the COT sharing from which the BS can start to share the COT.

11. The method of claim 7, wherein
if the UE transmits one or more further CG-PUSCHs to the BS after the second CG-PUSCH, each of the one or more further CG-PUSCHs includes a CG-UCI indicating COT sharing information that is aligned with the first and second sharing information.

12. The method of claim 6, wherein
if the first COT sharing information indicates that the UE does not allow COT sharing by the BS, the second COT sharing information overrides the first COT sharing information if the second COT sharing information indicates that the UE allows COT sharing by the BS.

13. A method for Channel Occupancy Time (COT) sharing, performed by a Base Station (BS), comprising:
receiving, from User Equipment (UE), COT sharing information indicated in a Configured Grant Uplink Control Indicator (CG-UCI) that is included in a Configured Grant Physical Uplink Shared CHannel (CG-PUSCH),
wherein if an Energy Detection (ED) threshold for COT sharing is not configured by the BS to the UE, the COT sharing information includes sharing on/off information.

14. The method of claim 13, wherein
if the ED threshold for COT sharing is configured by the BS to the UE, the COT sharing information includes an indication of a slot offset O and an allowable transmission duration, wherein O is a positive integer;
wherein the method comprises:
determining a start of COT sharing, from which the BS can start to share the COT, as a first symbol of a slot numbered with n+O, if the CG-PUSCH is received in a slot numbered with n, wherein n is an integer;
determining a duration that the BS is allowed to share the COT based on the allowable transmission duration.

15. The method of claim 13, comprising:
determining whether COT sharing is allowed based on the sharing on/off information;
if it is determined that COT sharing is allowed, determining a start of COT sharing, from which the BS can start to share the COT, as the first symbol of a slot numbered with n+1 plus i symbols, if the CG-PUSCH is received in a slot numbered with n, wherein n is an integer, and wherein i is an integer being equal to or greater than zero and is semi-statically configured.

16. The method of claim 13, wherein the base station is an eNB for a Long Term Evolution (LTE) system or a gNB for 5th Generation (5G) system.

17. User equipment (UE), comprising one or more storage medium storing computer readable instructions, and one or more computing processors configured to execute the computer readable instructions for performing the method of claim 1.

18. A base station (BS), comprising one or more storage medium storing computer readable instructions, and one or more computing processors configured to execute the computer readable instructions for performing the method of claim 13.

* * * * *